(No Model.)

E. W. COOKE.
CAGE FOR JOURNAL BEARINGS.

No. 458,520. Patented Aug. 25, 1891.

Witnesses:

Inventor:
Ernest W. Cooke
by Haupt Brothers.
Attorney.

UNITED STATES PATENT OFFICE.

ERNEST W. COOKE, OF CHICAGO, ILLINOIS.

CAGE FOR JOURNAL-BEARINGS.

SPECIFICATION forming part of Letters Patent No. 458,520, dated August 25, 1891.

Application filed December 13, 1889. Serial No. 333,670. (No model.)

*To all whom it may concern:*

Be it known that I, ERNEST WILLIAM COOKE, a citizen of the United States, residing in Chicago, county of Cook, and State of Illinois, have invented a new and useful Improvement in Cages for Roller-Bearings, of which the following is a specification.

My invention relates to a cage for roller-bearings which is adapted to hold a series of rollers running in contact with the axle or shaft, the said roller being secured by a series of pins secured to collars, two sides of the pins being flattened at one end, the said end projecting into a cavity in the end of the said rollers, the collars being secured by stay-bolts running horizontally, forming a cage to hold the rollers.

My object is to secure a cage for roller-bearings that will reduce the friction to a minimum and at the same time allow for the economic use of lubricants. I attain this object by means of the device shown in the accompanying drawings, in which—

Figure 2:
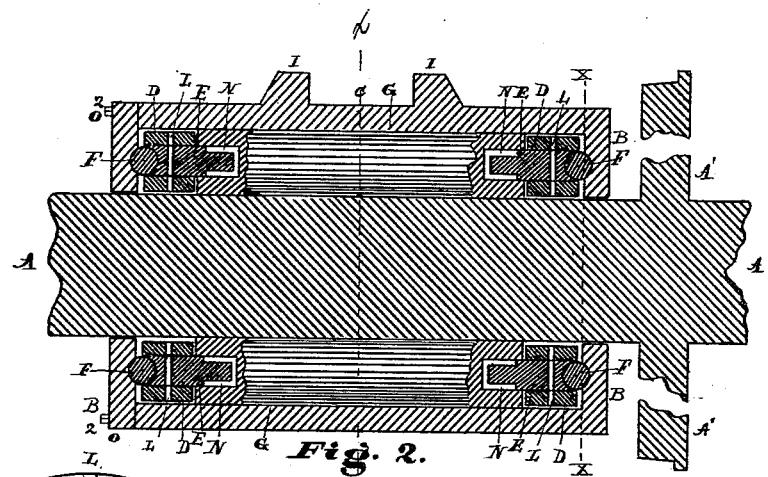
Figure 1:
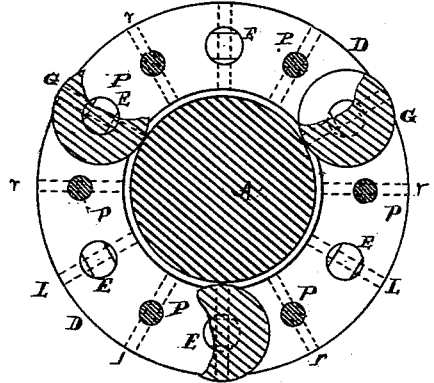
Figure 3:
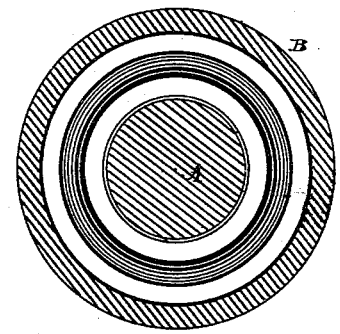
Figure 4:
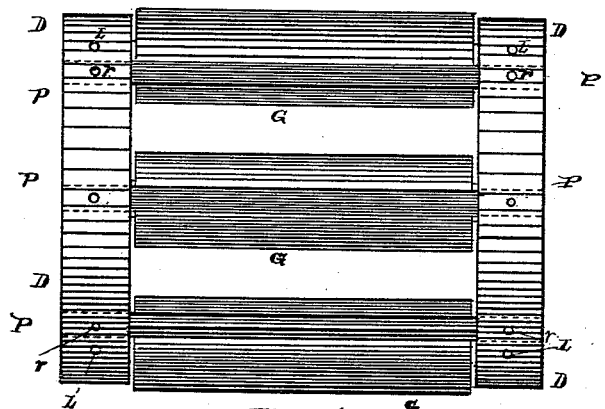

Figure 1 is a view of one of the end collars showing three rollers *in situ* and cut away to show the pins in the sockets. Fig. 2 is a vertical section in the median line of the cage. Fig. 3 is a vertical sectional view on line $xx$, Fig. 2; Fig. 4, a side elevation of my invention.

Similar letters and figures refer to similar parts throughout the several views.

I make a box B of convenient form, into which I fit the axle or shaft A, having a wheel A', which I introduce to show the method of using my device, as the axle may be line-shafting, if desired, and the wheel a wagon or buggy wheel. The box B is provided on top with lugs 1 1 and a depression C for holding the box in place or retaining the timbers of a truck.

Within the box B, I place two collars D D, which encircle the axle or shaft and each of which has an annular groove upon its outer face, in which groove is placed metallic balls F, which engage with a corresponding groove in the end plate of the box in juxtaposition to the said collar. In these collars I drill at convenient points a series of cylindrical holes, in which are inserted pins E, said pins being secured and prevented from turning by pins L inserted in holes drilled radially through the collars and shanks of the pins E. The end of the pin E that projects beyond the collar D is flattened on one or more sides and placed in the collar D in such fashion that the flattened sides shall be at right angles to the radius of the collar D, in which they are placed. The pins may be set, if found desirable, so that the flattened sides shall be in line with the radius of the collar D. The pins E enter the roller G by the socket N, in which socket they are placed, and allow of the rotation of the roller about them as a pivot. A portion of the pin E within the socket N is cylindrical and acts as a plug to the end of the socket N. On these pins E rotate the rollers G, which play against the axle or shaft A. The collars D and D are secured together, forming a cage to contain the rollers G, by the stay-bolts P, which said stay-bolts P are drilled at the end to correspond with a hole drilled radially in the collar D D, to which the bolt P is secured by the pin $r$. I secure the cage and rollers D in the box B by the end plate O, bolted on the body B by the bolts 2 2.

Having described the parts of my invention, I now proceed to explain the method of operating the same. I put the rollers in the collars D, first filling the socket N with a suitable lubricant, into which the pins E are pressed. I then secure the collars D D together by the stay-bolts P, forming a cage containing the rollers G. The cage I introduce in the box B on the balls F, which are previously placed in the groove in the face-plate. I then introduce a suitable quantity of a fluid lubricant and secure the plate O, having first set the balls F in position.

I am aware that anti-friction cages for roller-bearings have been used prior to my invention, and I do not lay claim to the broad principle of anti-friction cages for roller-bearings; but What I do claim, and desire to secure by Letters Patent, is—

1. The combination, with a cage for roller-bearings, consisting of two collars having pins with flattened ends projecting from their inner faces and tie-rods for holding the said collars together, of rollers having sockets at their ends to receive the ends of said pins, as described.

2. The combination, with a box having grooves in its end plates, a cage for roller bearings contained in the said box and consisting of two collars having annular grooves upon their outer faces, and pins having flattened ends projecting from their inner faces, and rods holding the said collars together, of rollers having sockets in their ends to receive the flattened ends of the said pins, and balls contained in the said grooves, in the collars, and in the end plates of the box, as described.

ERNEST W. COOKE.

In presence of—
  T. E. SHEEHE,
  T. MCALLISTER.